US012806577B2

(12) United States Patent
Kalyani et al.

(10) Patent No.: US 12,806,577 B2
(45) Date of Patent: Nov. 24, 2026

(54) POROUS POLYETHYLENE FILTER MEMBRANE, AND RELATED FILTERS AND METHODS

(71) Applicant: ENTEGRIS, INC., Billerica, MA (US)

(72) Inventors: Vinay Kalyani, Salem, NH (US); Christi A. Dawydiak, Arlington, MA (US)

(73) Assignee: Entegris, Inc., Billerica, MA (US)

( * ) Notice: Subject to any disclaimer, the term of this patent is extended or adjusted under 35 U.S.C. 154(b) by 0 days.

(21) Appl. No.: 17/532,773

(22) Filed: Nov. 22, 2021

(65) Prior Publication Data

US 2022/0168693 A1 Jun. 2, 2022

Related U.S. Application Data

(60) Provisional application No. 63/119,168, filed on Nov. 30, 2020.

(51) Int. Cl.

*B01D 69/02* (2006.01)
*B01D 67/00* (2006.01)
*B01D 69/10* (2006.01)
*B01D 71/26* (2006.01)

(52) U.S. Cl.

CPC ......... *B01D 69/02* (2013.01); *B01D 67/0023* (2013.01); *B01D 69/107* (2022.08); *B01D 71/261* (2022.08); *B01D 2325/02833* (2022.08); *B01D 2325/04* (2013.01); *B01D 2325/34* (2013.01)

(58) Field of Classification Search

None
See application file for complete search history.

(56) References Cited

U.S. PATENT DOCUMENTS

| | | | |
|---|---|---|---|
| 5,846,422 A | 12/1998 | Ditter et al. | |
| 8,758,887 B2 | 6/2014 | Yen | |
| 9,694,344 B2 | 7/2017 | Song | |
| 2008/0020192 A1* | 1/2008 | Yen | B29C 48/307 264/45.9 |
| 2008/0057388 A1 | 3/2008 | Kono et al. | |
| 2008/0057389 A1* | 3/2008 | Kono | H01M 50/491 156/244.11 |
| 2009/0032470 A1 | 2/2009 | Bacino et al. | |

(Continued)

FOREIGN PATENT DOCUMENTS

| | | |
|---|---|---|
| EP | 2111910 A1 | 10/2009 |
| JP | 5671004 B2 | 10/2012 |

(Continued)

OTHER PUBLICATIONS

Jornitz et al., When Does Flow Rate Matter? Criteria for Testing Optimal Filter Flow Rate, BioPharm International, Feb. 21, 2006 (https://www.biopharminternational.com/view/when-does-flow-rate-matter-criteria-testing-optimal-filter-flow-rate).

*Primary Examiner* — Benjamin L Lebron
*Assistant Examiner* — Eric J McCullough

(57) ABSTRACT

Described are porous filter membranes that include two opposed sides, a thickness, and a porous structure between the opposed sides; filter components and filters that include this type of porous filter membrane; methods of making the porous polyethylene filter membranes, filter components, and filters by co-extrusion techniques; and methods of using a porous filter membrane, filter component, or filter as described.

16 Claims, 5 Drawing Sheets

(56) References Cited

U.S. PATENT DOCUMENTS

2009/0117455 A1 5/2009 Takita et al.
2009/0148685 A1 6/2009 Kang et al.
2009/0269656 A1 10/2009 Takita et al.
2009/0269672 A1 10/2009 Takita et al.
2009/0274955 A1 11/2009 Kikuchi et al.
2010/0212504 A1 8/2010 Shimizu et al.
2010/0313753 A1 12/2010 Calis et al.
2011/0104468 A1 5/2011 Rhee et al.
2012/0028102 A1 2/2012 Ishihara et al.
2012/0061314 A1* 3/2012 Choi .................. B01D 67/0088 210/490
2013/0092622 A1 4/2013 Kas et al.
2014/0048476 A1 2/2014 Ge et al.
2015/0270521 A1 9/2015 Jehara et al.
2016/0030974 A1 2/2016 Kang et al.
2016/0082397 A1 3/2016 Ohno et al.
2016/0096152 A1* 4/2016 Ohno ................... B01D 67/003 210/500.36
2016/0118639 A1 4/2016 Ishihara
2017/0005321 A1 1/2017 Sugata et al.
2017/0125766 A1 5/2017 Harumoto et al.
2017/0128876 A1 5/2017 Shibuya et al.
2017/0149038 A1 5/2017 Miura et al.
2017/0216832 A1 8/2017 Takahashi et al.
2017/0274329 A1 9/2017 Mizuno et al.
2017/0282513 A1 10/2017 Sugata et al.
2017/0309883 A1 10/2017 Mizuno et al.
2018/0008939 A1 1/2018 Lee et al.
2018/0280894 A1 10/2018 Iwai et al.
2020/0055002 A1 2/2020 Loewe et al.
2020/0139309 A1 5/2020 Cheng
2020/0222859 A1 7/2020 Patel et al.
2020/0368691 A1 11/2020 Kamimura et al.
2021/0001277 A1 1/2021 Nikoloudis et al.
2021/0043903 A1 2/2021 Okada
2021/0308633 A1 10/2021 Iwai et al.
2021/0354092 A1 11/2021 Wu et al.
2021/0402357 A1 12/2021 Ikuta et al.
2022/0161200 A1 5/2022 Nambu et al.
2022/0209272 A1 6/2022 Yamaguchi et al.

FOREIGN PATENT DOCUMENTS

JP 2018126936 A 8/2018
KR 20140002222 A 1/2014
WO 2022014301 A1 1/2022
WO 2022107856 A1 5/2022
WO 2023017784 A1 2/2023
WO 2023017785 A1 2/2023

* cited by examiner

POROUS POLYETHYLENE FILTER MEMBRANE, AND RELATED FILTERS AND METHODS

CROSS-REFERENCE TO RELATED APPLICATIONS

This application claims the benefit under 35 USC 119 of U.S. Provisional Patent Application No. 63/119,168 filed Nov. 30, 2020, the disclosure of which is hereby incorporated herein by reference in its entirety.

FIELD OF THE INVENTION

The following description relates to porous polyethylene filter membranes that include two opposed sides, a thickness, and a porous structure between the opposed sides; additionally to filter components and filters that include this type of porous polyethylene filter membrane; to methods of making the porous polyethylene filter membranes, filter components, and filters by co-extrusion techniques; and to methods of using a porous polyethylene filter membrane, filter component, or filter.

BACKGROUND

Filter membranes and filter products are indispensable tools of modern industry, used to remove unwanted materials from a flow of a useful fluid. Useful fluids that are processed using filter membranes include water, industrial solvents and processing fluids, industrial gases used for manufacturing (e.g., in semiconductor fabrication), and liquids that have medical or pharmaceutical uses. Examples of impurities and contaminants that may be removed from fluids by a filter membrane include unwanted particles, microorganisms, volatile organic materials, and unwanted chemical species.

Many filter membranes are designed to remove unwanted materials from a liquid. Filter membranes used for filtering a liquid on a commercial or industrial scale will have pore sizes and porosities that are effective to allow for a useful level of flow (which may be measured as a flow rate, a flux, or a "flow time") of a desired liquid through the filter, meaning a level of flow that efficiently supplies an amount (volume per time) of the liquid to a commercial system that uses the liquid, such as an apparatus ("tool") used for semiconductor or microelectronic device manufacturing. Filter membranes that are used for processing (filtering) a liquid are referred to as "liquid-flow" or "liquid-flowable" filter membranes, as compared to filter membranes designed to process (remove materials by filtering) a gaseous fluid.

Various polymer materials have been used for making filter membranes, including certain types of polyolefins, polyhaloolefins, polyesters, polyimides, polyetherimides, polysulfones, and polyamides (e.g., nylons). One example of a common material is polyethylene, including types of polyethylene referred to as high molecular weight polyethylene and "ultra-high molecular weight polyethylene" (UPE). Polyethylene (e.g., UPE) filter membranes are commonly used for filtering liquid materials used in photolithograpy processing and "wet etch and clean" (WEC) applications for semiconductor processing.

Many different techniques are known for forming porous filter membranes that may be either gaseous-flow membranes or liquid-flow membranes. Example techniques include melt-extrusion (e.g., melt-casting) techniques and coagulation coating (phase separation) techniques, among others. The different techniques for forming a porous polymeric filter membrane can often produce different membrane structures in terms of the size and distribution of pores that are formed within the membrane. Different techniques produce different pore sizes and membrane structures, with these properties sometimes being referred to as morphology of a porous membrane, which can refer to features of a porous membrane that include size, shape, uniformity, and distribution of pores within a membrane.

Examples of membrane morphologies include homogeneous (isotropic) and asymmetric (anisotropic) morphologies. A membrane that has pores of substantially uniform size uniformly distributed throughout the membrane is often referred to as isotropic, or "homogeneous." An anisotropic (a.k.a., "asymmetric") membrane may be considered to have a morphology that includes a pore size gradient (non-uniform pore distribution) across the membrane—for example, a membrane may have relatively larger pores at one membrane surface, and relatively smaller pores at the other membrane surface, with the pore structure varying along the thickness of the membrane.

As feature sizes of semiconductor chips and other microelectronic devices continue to become smaller and smaller, the need to reduce contaminants in liquids that are used for processing these products increases. Contaminants that may be present in fluids ("process fluids") used to process microelectronic devices and semiconductor chips cause defects and reduce process yields. Processes used for devices with smaller and smaller features require filters that can remove smaller and smaller size contaminants from process fluids. To remove smaller and smaller particles, a filter membrane may be designed to have smaller and smaller pore sizes. But as the size of pores of a filtration membrane is reduced, rate of flow of fluid through the filter normally decreases due to smaller flow paths of the smaller size pores.

One way to overcome a reduced rate of flow (volume per area of filter) of liquid, through a filter membrane, due to a smaller pore size of the filter, is to increase the amount (i.e., area) of filter through which the liquid can flow. A larger area of the filter can process a higher total volume of the fluid per time, at the reduced rate of flow of the liquid per area of the filter. A larger area of filter may be provided by using more individual filters, to accommodate the lower flow rate per area of filter membrane. But adding filters or otherwise increasing an amount (area) of filter membrane used to process a given flow of liquid, due to a lower flow rate per area of the filter, will add to overall costs of processing. Additionally, the space that is available in a processing tool for increasing the size of required filtering equipment is limited, meaning using larger filters or multiple filters is both complicated and expensive.

SUMMARY

The following description relates to porous filtration membranes (e.g., "membranes" for short) that exhibit useful or advantageous performance properties for filtering a liquid process fluid, preferably including useful flow properties (e.g., flow rate, flow time) in combination with effective particle removal properties (e.g., retention of various sizes of particles).

Described membranes have two opposed sides, with each side having a surface, and with a thickness between the two opposed surfaces. Each surface is associated with a pore structure that extends from the membrane surface to a depth below the surface. One side, which may be referred to as a "tight side" or a "retention side" of the membrane, has smaller pores, higher retention properties, and allows for a relatively lower rate of flow (exhibits higher resistance to flow) of liquid through the filter. The opposite side, which may be referred to as an "open side" of the membrane, has larger pores, lower retention properties, and allows for a relatively higher rate of flow (exhibits lower resistance to flow) of liquid through the filter.

The tight side has a thickness that is less than the thickness of the open side. Thickness in this regard refers to the amount of polymer (by weight) that makes up the tight side compared to the amount of polymer that makes up the open side.

A membrane as described can be prepared by a co-extrusion method. To produce a membrane having a tight side and an open side as described, with flow properties (e.g., bubble point, flow time) as described, the method of co-extrusion can be performed with selected and controlled features such as: relative flow rates of polymer solutions to produce a tight side with a lower thickness compared to the open side; a higher concentration of polymer in heated polymer solution used to form the tight side relative to the open side (to form smaller-sized pores in the tight side).

BRIEF DESCRIPTION OF THE DRAWINGS

The disclosure may be more completely understood in consideration of the following description of various illustrative embodiments in connection with the accompanying drawings.

DETAILED DESCRIPTION

Figure 1:
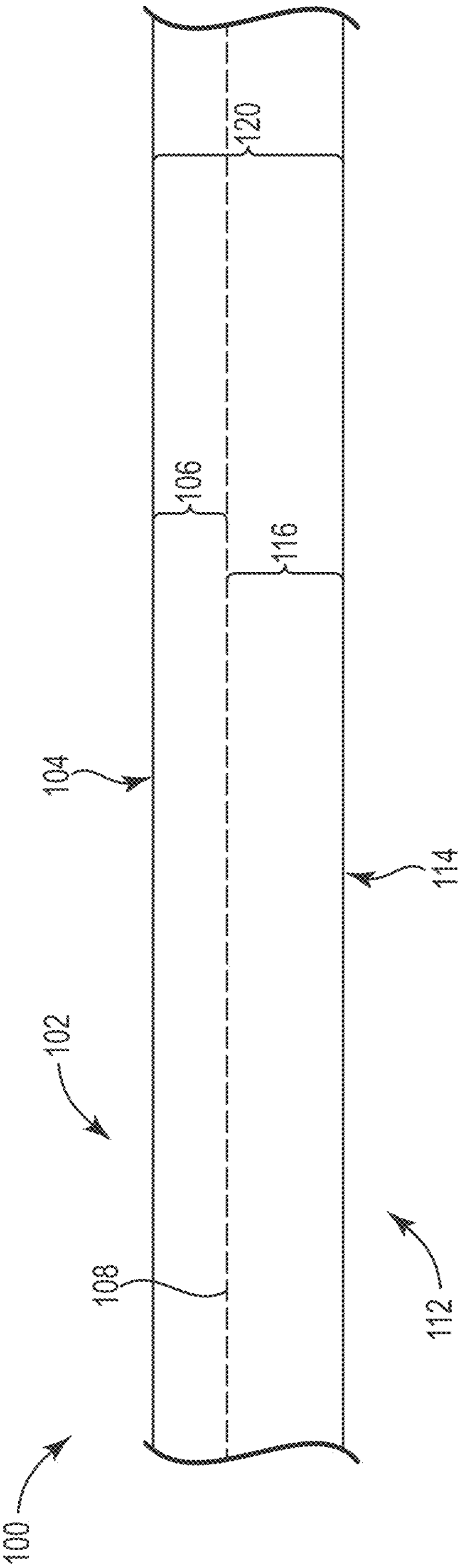
FIG. 1 shows a side cut-away view of a membrane as described.

Described herein are porous polyethylene filtration membranes that are effective for filtering (removing contaminants from) a liquid fluid. The membranes exhibit useful flow properties (e.g., flow rate, flow time) of a liquid through the membrane in combination with effective particle removal properties (e.g., retention of various sizes of particles), to provide efficient filtering performance of the membrane.

Example porous ("open pore") filter membranes can be in the form of a thin film or sheet-type membrane that includes two opposed sides (i.e., two opposed surfaces) and a thickness between the two sides. Between the two opposed sides, along a thickness of the membrane is an open pore cellular structure that includes three-dimensional, void microstructures in the form of open cells defined by a matrix of solid polymer material that forms the porous filter membrane. These cells are in communication with each other, i.e., are "open cells," to allow for liquid fluid to pass through the thickness of the membrane from one side of the membrane to the opposite side of the membrane. The open cells can be referred to as openings, pores, channels, or passageways, and are largely interconnected between adjacent cells to allow liquid fluid to flow through the thickness of the membrane.

In a membrane as described, the open pore structure includes pores that are distributed throughout and across the thickness of the membrane and are arranged with different pore sizes and different average pore sizes being present at different portions of the membrane, i.e., at different regions of thickness of the membrane. The membrane includes a first side (sometimes referred to as a "tight" side or a "retentive" side) that includes a distribution of relatively smaller pores, and a second side (an "open" side or a "support" side) that includes a distribution of relatively larger pores. The tight side of the membrane has smaller pores on average, higher retention properties, and due to the smaller pores (on average) can exhibit higher resistance to flow through the membrane. The tight side exhibits a higher resistance to flow relative to the open side and inhibits flow of liquid through the filter to a larger degree than does the open side. The open side has relatively larger pores, lower retention properties, causes a reduced resistance to flow (relative to the tight side), and allows for a relatively higher rate of flow of liquid through that portion of the filter.

Each one of the "tight side" and the "open side" is considered to refer to a portion of the membrane that includes one surface of the membrane along with a three-dimensional portion of the membrane that extends below the surface to a depth (or a "thickness") below the surface in the thickness direction of the membrane. Thus, each of the "tight side" and the "open side" is considered to include one surface of the membrane that bounds a three-dimensional portion of the membrane that resides below the surface, that may be characterized as having a thickness relative to the total thickness of the membrane, and that may additionally be characterized as having a width and a length that is shared with the entire membrane.

A thickness of a tight side and an open side may not necessarily be discernible by a physical examination of the membrane, because a boundary at a location internal to the membrane, between a tight side and an open side of the membrane, and between the polymeric materials used to produce each side, may be difficult to identify. A thickness of a tight side or an open side of a membrane and the relative magnitudes of each thickness may instead be assessed based on features of a co-extrusion step that is used to produce the membrane, by the relative amounts of polymer or polymer solution (by mass or volume) that are used to form the tight side compared to the open side, or both. For example, relative thicknesses of the tight side and the open side may be measured as the relative flow rates by volume or mass of the polymer solution that is used to form the tight side relative to the flow rate of the polymer solution used to form the open side. As another example, relative thicknesses of the tight side and the open side may be measured as the amount of polymer (by weight) that is part of the extruded tight side polymer solution relative to the amount of polymer (by weight) of the extruded open side polymer solution.

On any basis, example membranes as described are considered to have a tight side that has a thickness (relative to the total thickness of the membrane) that is less than a thickness of an open side, for example based on the tight side being prepared to contain a lower amount (based on mass or volume) of polymer compared to the amount of polymer in the open side. Example thicknesses of a tight side and an open side of a membrane may be of a tight side having a thickness of from 20 to 45 percent of the membrane and the open side having a thickness of from 55 to 80 percent, based on a total combined thickness of the open side and tight side; for example a membrane may include a tight side having a thickness of from 25 to 40 percent of the membrane and an open side having a thickness of from 60 to 75 percent of the membrane based on a total thickness of the open and tight side.

The tight side of the membrane functions as a retentive portion of the membrane and is responsible for physically retaining (catching) and removing particles or impurities from a liquid fluid as the fluid passes through the pores of the membrane. The tight side can effectively function as a retentive portion of the membrane without being unduly or excessively thick, and in fact a tight side that is less thick (i.e., that is thinner) will introduce a relatively reduced resistance to flow of liquid through the membrane and can therefore be advantageous. Accordingly, porous membranes as described can be made to include a tight side that is relatively thin (that has a lower thickness) compared to the thickness of the open side of the membrane.

The open side of the membrane functions to support the retentive side, and desirably is less restrictive to flow of liquid through the membrane. The average size of the pores of the open side will be greater than the average size of pores of the tight side.

The membrane, including both the tight side and the open side, can be made of polymer that comprises, consists of, or consists essentially of polyethylene, which includes a single type of polyethylene composition (e.g., based on molecular weight) or a blend of two or more different polyethylene compositions (e.g., a blend of two or more polyethylene compositions that have different molecular weights).

The term "polyethylene" refers to a polymer that has, in part or substantially, a linear molecular structure of repeating —$CH_2$—$CH_2$— units. Polyethylene is normally a semi-crystalline polymer that elongates before breaking, enhancing its toughness. Polyethylene can be made by reacting monomer composition that includes monomers comprising, consisting of, or consisting essentially of ethylene monomers. Thus, a polyethylene polymer may be a polyethylene homopolymer prepared by reacting monomers that consist of or consist essentially of ethylene monomers. Alternatively, a polyethylene polymer may be a polyethylene copolymer prepared by reacting a combination of ethylene and non-ethylene monomers that include, consist of, or consist essentially of ethylene monomers in combination with another type of monomer such as another alpha-olefin monomer, e.g., butene, hexene, or octane, or a combination of these; for a polyethylene copolymer, the amount of ethylene monomer used to produce the copolymer, relative to non-ethylene monomers, can be any useful amount, such as an amount of at least 50, 60, 70, 80, or 90 percent (by weight) ethylene monomer per total weight of all monomers (ethylene monomer and non-ethylene monomer) in a monomer composition used to prepare the ethylene copolymer.

As used herein, a composition (e.g., monomer composition) that is described as "consisting essentially of" a certain ingredient or a combination of specified ingredients is a composition that contains the ingredient or combination of specified ingredients and not more than a small or insignificant amount of other materials, e.g., not more than 3, 2, 1, 0.5, 0.1, or 0.05 weight percent of any other ingredient or combination of ingredients. A monomer composition described as containing monomers that "consist essentially of" ethylene monomers is a monomer composition that contains ethylene monomers and not more than a small or insignificant amount of other monomeric materials, e.g., not more than 3, 2, 1, 0.5, 0.1, or 0.05 weight percent of any other monomers.

A filter membrane as described is made of polymer that includes (e.g., comprises, consists essentially of, or consists of) polyethylene, which is a polymer that is commonly used in porous filter membranes. Polyethylene polymer compositions (ingredients) vary in properties such as molecular weight, density, molecular weight distribution, and melt index. Polyethylene having a molecular weight that is substantially greater than 1,000,000 Daltons is sometimes referred to as ultra-high molecular weight polyethylene (UPE). For membranes of the description, polyethylene ingredients that contain polyethylene having an average molecular weight that is greater than 500,000 Daltons, e.g., greater than 1,000,000 Daltons, such as in a range from 500,000 to 2,000,000 or 3,000,000 Daltons, may be useful for a tight side or an open side of the membrane. Molecular weight of a polymer reported in "Daltons" can be measured using known gel permeation chromatography (GPC) (also known as size-exclusion chromatography (SEC)) techniques and equipment.

A filter membrane, e.g., a tight side of a filter membrane, an open side of a filter membrane, or both, may be made from a single polyethylene polymer ingredient (having a particular average molecular weight and molecular weight range) or may be made of a blend of two or more different polyethylene polymer ingredients (each ingredient having a different average molecular weight and molecular weight range).

In certain examples, a membrane or a tight side or an open side thereof includes polyethylene that is provided by one or more polyethylene polymer ingredients, with the membrane (or a side thereof) comprising, consisting of, or consisting essentially of at least 50, 60, 70, 80, or 90 percent by weight polyethylene that has an average molecular weight in a range from 500,000 to 3,000,000 Daltons, e.g., from 500,000 Daltons to 1,000,000 Daltons, 1,500,000 Daltons, or 2,000,000 Daltons.

FIG. 1 is a schematic depiction of a membrane as described. Membrane 100 includes (e.g., comprises, consists essentially of, or consists of) tight side 102 and open side 112, and has a total thickness 120. Tight side 102 includes tight side surface 104 and a tight side thickness 106. Open side 112 includes open side surface 114 and an open side thickness 116. Dotted line 108 indicates a boundary between tight side 102 and open side 112, the boundary being an approximate or theoretical location of an interface or a division between the tight side and the open side.

As illustrated the thickness 106 of tight side 102 is less than the thickness 116 of open side 112. The difference in thicknesses is a result of features of a method of preparing membrane 100 by co-extruding polymer compositions to produce membrane 100 having a tight side and an open side as described, with different thicknesses and different morphology (average pore sizes). Boundary 108 is approximate, and a distinct boundary 108 is not necessarily identifiable upon physical inspection of membrane 100.

A membrane as described may be characterized (in addition to having an open side and a tight side as described) by features that include thickness (total thickness of the membrane), porosity, bubble point in one or two directions through the membrane, flow time, and retention.

A porous membrane as described can be in the form of a sheet having a substantially uniform thickness over a width and length of the sheet, the thickness being in a range from 30, 50, or 80, up to 200 microns, e.g., from 50 to 150 microns.

A membrane as described can have a porosity that will allow the membrane to be effective as described herein, to allow a suitable flow rate of liquid to pass through the membrane while also removing an effective amount of contaminants or impurities from the liquid. Examples of useful membranes can have a porosity of up to 80 percent, e.g., a porosity in a range from 60 to 80, e.g., 60 to 70 percent or from 40 to 60 percent. As used herein, and in the art of porous bodies, a "porosity" of a porous body (also sometimes referred to as "void fraction") is a measure of the void (i.e., "empty") space in the body as a percent of the total volume of the body and is calculated as a fraction of the volume of voids of the body over the total volume of the body. A body that has zero percent porosity is completely solid.

The sizes of the pores ("pore size") of a membrane (i.e., the average size of pores throughout the membrane or at different portions of the membrane), and the distribution of different sized pores in a membrane, in combination with porosity and thickness of the membrane, provide for desired flow of liquid fluid through the membrane, while also performing a desired high level of a filtering (e.g., as measured by retention).

Sizes of pores of a membrane will differ at different portions of the membrane, with pores of the tight being smaller than pores of the open side. Pores of a tight side may be of a size on average to provide a combination of useful filtering properties (as measured by retention) and desirable flow properties. Example pore sizes of a tight side of a membrane may be in a range from about 10, 20, 30 or nanometers, or 0.05 microns, up to about 10 microns, e.g., of sizes sometimes classified as "microporous," "ultraporous," or "nanoporous"; for purposes of the present description and claims, the term "microporous" is sometimes used to refer to pores within any of these size ranges, including microporous and sub-microporous sizes, as a way of distinguishing from materials having larger pore sizes, i.e., to distinguish over materials that are considered to be "macroporous." Examples of average pore sizes of an open side of a membrane as described may be in these same ranges but will be larger than the pores of the tight side.

Pore size of a membrane may not necessarily be measured directly but can be assessed based on a correlation to the property known as "bubble point" (meaning, herein, "mean bubble point") which is an understood property of a porous filter membrane. Bubble point corresponds to pore size, which may correspond to filtering performance, e.g., as measured by retention. A smaller pore size can correlate to a higher bubble point and often to better filtering performance (higher retention). Normally, however, a higher bubble point also correlates to relatively higher resistance of flow through a porous material, and a higher flow time (higher resistance to flow and a lower rate of flow for a given pressure drop). Example filter membranes of the present description can exhibit a combination of a relatively higher bubble point, good filtering performance, and a useful level of flow, e.g., a flow rate or "flow time" that allows for the filter membrane to be used in a commercial filtering process.

For the purposes of this disclosure, the mean bubble point is determined using the following procedure, herein after referred to as "the Mean Bubble Point Test". A dry sample of a membrane is placed on a holder a gas pressure is gradually applied to the tight side of the dry membrane using compressed air. The air flow rate through the dry membrane is measured as a function of pressure. Next the membrane is wetted with ethoxy-nonafluorobutane HFE-7200 (available from 3M). Gas pressure is gradually applied to the tight side of the wetted membrane using compressed air. The air flow rate through the wetted membrane is measured as a function of pressure. This test is performed at ambient temperature (e.g., at approximately 25 degrees Celsius, but is not temperature controlled). The mean bubble point is the pressure at which the ratio of the air flow of the wet membrane to the air flow of the dry membrane is 0.5.

Examples of useful mean bubble points of a porous filter membrane as described, measured using the Mean Bubble Point test can be at least 50, 80, 90, 100, or 120 pounds per square inch (psi) or greater, e.g., up to 200 or 300 pounds per square inch, while the membrane also exhibits useful properties of flow time and retention as described elsewhere herein In combination with a desired bubble point and filtering performance, a membrane as described can exhibit a useful, effective level of a resistance to flow of liquid through the membrane. A resistance to flow of liquid through the membrane can be measured in terms of flow rate or flow time (which is inverse to flow rate). A membrane as described can preferably have a useful or a relatively low flow time, preferably in combination with a bubble point that is relatively high, and good filtering performance. A level of effectiveness of a filter membrane in removing unwanted material (i.e., "contaminants") from a liquid can be measured, in one fashion, as "retention." Retention, with reference to the effectiveness of a filter membrane (e.g., a filter membrane as described) generally refers to a total amount of an impurity (actual or during a performance test) that is removed from a liquid that contains the impurity, relative to the total amount of the impurity that was in the liquid before passing the liquid through the filter membrane. The "retention" value of a filter membrane is, thus, a percentage, with a filter that has a higher retention value (a higher percentage) being relatively more effective in removing particles from a liquid, and a filter that has a lower retention value (a lower percentage) being relatively less effective in removing particles from a liquid. Membranes prepared according to example methods of the present description can exhibit filtering performance as measured by retention that is at least comparable to commercial filter membranes that are prepared from comparable materials (e.g., polyethylene), that have comparable, nearly comparable, or somewhat similar thickness, and flow properties (as measured by flow time) and bubble points that are within broadly similar ranges. As shown below in the Example, membranes as described herein have lower flow times relative to bubble point when compared to previous membranes, in other words previous comparative membranes will not share both a bubble point and a flow time property of a membrane having the properties disclosed herein.)

In particular examples, membranes of the present description can exhibit a useful or improved combination of bubble point (mean bubble point) and flow properties of a liquid through the membrane (e.g., as measured in terms of flow time). Compared to comparable polyethylene porous filter membranes, useful or preferred membranes of the present description can have a highly desirable combination of increased bubble point, for a similar flow time. Over a range of bubble points relative to flow time, example membranes may exhibit a higher bubble point for an equal flow time, or alternatively stated, a reduced (improved) flow time at an identical bubble point. Example membranes can exhibit flow time and bubble point properties such as the following: a flow time below 2000 seconds and a mean bubble point of 75 psi or greater a flow time below 3000 seconds and a mean bubble point of 100 psi or greater; a flow time below 4000 seconds and a mean bubble point of 125 psi or greater; r a flow time below 6000 seconds and a mean bubble point of 150 psi or greater; or a flow time below 10000 seconds and a mean bubble point of 175 psi or greater. These membranes also exhibit useful levels of filtering measured in terms of "retention," e.g., filtering performance that is in a range comparable to other polyethylene filters of comparable thickness.

For the purposes of this disclosure, the flow time is determined using the following procedure, herein after referred to as "the Flow Time Test". To measure the flow time, isopropyl alcohol (IPA) is applied to the open side (larger pore size) of a 47 mm membrane disc at a pressure of 14.2 psi. If the pressure is different than 14.2 psi, the flow time is normalized to 14.2 psi. The time required to flow a certain volume of fluid through the membrane is measured and the time required to flow 500 mL is calculated. The temperature of the fluid is also measured, and the time is corrected for the change in viscosity versus temperature and normalized to 21 degrees C. using the following equation:

Flow time (*s*)=measured time (*s*)*[500 (ml)/measured volume (ml)]*[measured pressure (psi)/14.2 (psi)]*Viscosity Correction Viscosity Correction=Measured temp (C)*0.0313+0.356

According to another preferred measure, example membranes as described can exhibit flow time and bubble point properties such as: a flow time below 1500 seconds and a mean bubble point of 75 psi or greater; a flow time below 2500 seconds at a mean bubble point of 100 psi or greater; a flow time below 3000 seconds at a mean bubble point of 125 psi or greater; a flow time below 5000 seconds at a mean bubble point of 150 psi or greater; and a flow time below 8000 seconds at a mean bubble point of 175 psi or greater. These membranes also exhibit useful levels of filtering measured in terms of "retention," e.g., filtering performance that is in a range comparable to other polyethylene filters of comparable thickness.

Stated in a manner that characterizes a range of maximum flow time of a filter relative to mean bubble point, example membranes as described can exhibit a measured log 10 flow time (seconds) relative to mean bubble point (pounds per square inch) that is less than a log 10 flow time relative to mean bubble point according to the equation: log 10(flow time)=2.757+0.007105*(mean bubble point). In other embodiments, example membranes as described can exhibit a measured log 10 flow time (seconds) relative to mean bubble point (pounds per square inch) that is less than or equal to a log 10 flow time relative to mean bubble point according to the equation: log 10(flow time)=2.707+0.006485*(mean bubble point). In some embodiments, example membranes as described can exhibit a measured log 10 flow time (seconds) relative to mean bubble point (pounds per square inch) that is less than a log 10 flow time relative to mean bubble point according to the equation: log 10(flow time)=2.757+0.007105*(mean bubble point) and greater than or equal to the equation: log 10(flow time)=2.4888+0.006593*(mean bubble point). In some embodiments, example membranes as described can exhibit a measured log 10 flow time (seconds) relative to mean bubble point (pounds per square inch) that is less than or equal to a log 10 flow time relative to mean bubble point according to the equation: log 10(flow time)=2.707+0.006485*(mean bubble point) and greater than or equal to the equation: log 10(flow time)=2.4888+0.006593*(mean bubble point). In some embodiments, example membranes as described can exhibit a measured log 10 flow time (seconds) relative to mean bubble point (pounds per square inch) that is 5 percent less than, or 10 percent less than a flow time relative to mean bubble point according to the equation log 10(flow time)=2.757+0.007105*(mean bubble point) or the equation log 10(flow time)=2.707+0.006485*(mean bubble point).

A process for preparing a porous filter membrane as described can be of a type of method sometimes referred to as an "extrusion melt-cast" process, or as "thermally-induced liquid-liquid phase separation," performed by co-extruding two flows of polymer (two different heated polymer solutions) to form a membrane as described, that contains the tight side and the open side.

In this type of process generally, polymer (e.g., polyethylene) is dissolved at elevated temperature ("extrusion temperature") in one or more solvents to form a heated polymer solution that can be processed and shaped, e.g., through an extruder. The heated polymer solution can be passed through an extruder and an extrusion die to exit the die and be caused to solidify in a desired shape, such as in the form of a sheet-like membrane. The heated polymer solution is passed through the die and is dispensed onto a shaping surface that is at a temperature that is much lower than the extrusion temperature, i.e., a "cooling temperature." When the extruded, heated polymer solution contacts the lower-temperature shaping surface, the polymer and solvents of the heated polymer solution undergo one or more phase separations in a manner that causes the polymer to be formed into an open-pore, porous membrane.

The heated polymer solution can be prepared to contain polyethylene (as described herein) dissolved in solvent that includes a first ("strong") solvent and a second ("weak") solvent. The polymer of the polymer solution may comprise, consist of, or consist essentially of polyethylene as described herein.

A strong solvent is capable of substantially dissolving the polymer into the heated polymer solution. Examples of useful strong solvents include organic liquids in which polyethylene polymer as described herein is highly soluble at an extrusion temperature, and in which the polyethylene polymer has a low solubility at a cooling temperature. Examples of useful strong solvents include mineral oil and kerosene.

The weak solvent is one in which the polyethylene polymer has a low solubility at the extrusion temperature and at the cooling temperature, and that is miscible with the strong solvent at extrusion temperature and is immiscible with the strong solvent at cooling temperature. Particular examples of weak solvents include dioctyl phthalate, dibutyl sebatacate (DBS), dioctyl sebacate, di(2-ethylhexyl) phthalate, di-(2-ethylhexyl) adipate, dibutylphthalate, tetralin, n-decanol, 1-dodecanol, diphenylmethane, and mixtures thereof.

The amount of the polymer (e.g., polyethylene or polyethylene with one or more other polymers) contained in the heated polymer solution, relative to the amount of solvent, can be an amount that is sufficiently high to allow for the heated polymer solution to be processed by extrusion, through an extruder and a die, and that is sufficiently low to allow the polymer in the polymer solution to coalesce and form into a desired porous morphology upon casting and cooling. A useful or preferred amount of polymer as described herein that can be included in a heated polymer solution as described, and processed as described, can be in a range from 5, 10, or 15, up to 35 weight percent, such as from 17 to 20, 25, or 30 weight percent polymer, based on total weigh heated polymer solution. The balance of the heated polymer solution can be a combination of one or more weak solvents and one or more strong solvents. Thus, useful or preferred heated polymer solutions can contain, e.g., from 65 to 85, 90, or 95 weight percent solvent (a combination of weak and strong solvents), such as from 70 to 75, 80, or 83 weight percent solvent based on total weight heated polymer solution.

The relative amounts of strong solvent to weak solvent can be selected as desired, to achieve a desired pore structure of a porous membrane. A larger relative amount of strong solvent can produce a filter membrane having smaller pores. A larger relative amount of weak solvent can produce a filter membrane having larger pores. Useful relative amounts of strong solvent to weak solvent can vary within ranges that include (strong solvent:weak solvent) from 10:90 to 90:10, from 20:80 to 80:20, from 25:75 to 75:25, and from 40:60 to 60:40.

When the heated polymer solution is rapidly cooled, multiple physical changes in the polymer solution result in the formation of a porous filter membrane from the extruded heated polymer solution. As one change, the rapid cooling of the heated polymer solution causes phase separation of the solution into two liquid phases: a liquid phase of the strong solvent that contains a high level of the dissolved polymer, and a liquid phase of the weak solvent that contains a low amount of the dissolved polymer. An additional change caused by the rapid cooling is to cause the polymer dissolved in the strong solvent to coalesce and precipitate out of the strong solvent as a solid polymer phase.

A useful process, in more detail, can be based on a thermally-induced phase separation process that includes liquid-liquid phase separation of the weak solvent and the strong solvent (with dissolved polymer). According such methods, a heated polymer solution that contains polymer (comprising, consisting of, or consisting essentially of polyethylene as described) dissolved in strong solvent, additionally in combination with a second solvent (referred to as a "weak solvent" or even a "non-solvent" or "porogen"), forms a heated polymer solution. This heated polymer solution system is characterized as having: a range of temperatures at which the solution maintains a state of a homogeneous solution of the polymer dissolved in the combination of the strong solvent and the weak solvent, and a second (lower) range of temperatures at which the solution will become phase separated.

By cooling the heated polymer solution from an elevated ("extrusion") temperature to a reduced ("cooling") temperature, the heated polymer solution initially separates into the two liquid phases: a phase of the strong solvent with a high dissolved polymer content, and a phase of the weak solvent with a low dissolved low polymer content. Upon additional cooling to below a solidification temperature, the high-polymer-content phase solidifies to form a three-dimensional membrane structure. The rate of cooling the heated polymer solution can affect the pore structure being created. Generally, faster cooling results in the formation of smaller pores.

The heated polymer solution formed from the polymer and the weak and strong solvents can be extruded, passed through an extrusion die, and shaped as desired, during a heated extrusion step. Many examples of useful extruding equipment are known and commercially available a single commercial example being the Leistritz 27 millimeter twin screw, co-rotation extruder. Conventional dies such as sheeting dies, casting molds, doctor blades, profiled dies, are also well known and will be understood to be useful according to the present description.

The extruded heated polymer solution can be cooled by contacting any shaping surface, such as a cooling roll or "chill roll."

A useful or preferred extrusion temperature, i.e., the temperature of the heated polymer solution exiting an extruder die, can be, for example, in a range from 180 to 250 degrees Celsius, e.g., from 195 to 220 degrees Celsius.

A useful or preferred cooling temperature, e.g., a temperature of a surface onto which the heated polymer solution is extruded, such as a surface chill roll, can be, for example, in a range from 10 to 50 degrees Celsius, e.g., from 25 to 40 degrees Celsius.

According to the present description, a porous membrane can be formed by an "extrusion melt-cast" process (that involves "thermally-induced liquid-liquid phase separation") using a co-extrusion method that involves the flow and extrusion of two heated polymer solutions. One heated polymer solution is referred to as a tight side heated polymer solution and is formed and extruded using the co-extrusion method to form the tight side of the membrane. A second heated polymer solution is referred to as an open side heated polymer solution and is formed and extruded using the co-extrusion method to form the open side of the membrane.

According to inventive methods, features of the co-extrusion process and features of the two different heated polymer solutions can be selected and controlled to produce porous filter membranes as described, having a tight side and an open side with morphologies and relative thicknesses as described, and having flow properties and bubble point properties as described, with effective filter retention properties.

To produce a membrane as described, having a tight side and an open side as described, with the open side having larger pores and a greater thickness compared to the tight side, various features of the co-extrusion method can be selected and controlled. These include: the composition of the first heated polymer solution and the polymer (polyethylene) thereof; the composition of the second heated polymer solution and the polymer (polyethylene) thereof; and the relative amounts (relative flow rates in mass per time, e.g., pounds per hour) of each of the first heated polymer solution and the second heated polymer solution that flow through the extruder to form the co-extruded membrane, which may be controlled by the thicknesses of an extruded layer of each, as may be affected by a flow rate of each through an extrusion die.

A membrane that is produced will have a tight side that has a thickness (relative to the total thickness of the membrane) that is less than a thickness of an open side, and that is a lower portion of the total thickness of the membrane as compared to the thickness of the open side. An example membrane that is considered to have a tight side that has a lower thickness compared to a thickness of an open side of the membrane can have a tight side that contains a lower amount of polymer than the amount of polymer contained in the open side. A tight side of an example membrane as described may contain from 15 to 40 weight percent of a total amount of polymer of the tight side and the open side, e.g., from 25 to 35 weight percent of the total amount of polymer of the tight side and the open side of the membrane. An open side of the example membrane would contain from 60 to 80 weight percent of a total amount of polymer of the tight side and the open side, e.g., from 65 to 75 weight percent of the total amount of polymer of the tight side and the open side of the membrane.

The amount of polymer that makes up the tight side, relative to the amount of polymer that makes up the open side, can be affected or controlled by feature of the co-extrusion process, such as the relative flow rates of the tight side heated polymer solution and the open side heated polymer solution. In an example process, a tight side heated polymer solution may have a flow rate (e.g., mass per time) from a die, during a co-extrusion process, that is lower than a flow rate of the open side heated polymer solution. As specific examples, a flow rate of a tight side heated polymer solution may be in a range from 15 to 40 weight percent of a total (combined) flow rate of tight side heated polymer solution and open side heated polymer solution, from a co-extrusion die, e.g., a flow rate of the tight side heated polymer solution may be in a range from 25 to 35 weight percent based on the total flow rate (by mass) of both the tight side heated polymer solution and the open side heated polymer solution. The flow rate of the open side heated polymer solution may be in a range from 60 to 80 weight percent of a total (combined) flow rate (by mass) of tight side heated polymer solution and open side heated polymer solution, from the co-extrusion die, e.g., the flow rate of the open side heated polymer solution may be in a range from 65 to 75 weight percent based on the total flow rate of both the tight side heated polymer solution and the open side heated polymer solution.

Additionally or optionally, to affect morphology (e.g., average pore size) of a tight side as compared to an open side of the membrane, a tight side heated polymer solution may contain a higher concentration of polymer (by weight) relative to the concentration of polymer in the open side heated polymer solution. A higher concentration of polymer in a heated polymer solution, upon coagulation, can cause pores of the coagulated film to be relatively smaller compared to pores formed from heated polymer solution that contains a lower concentration of the polymer.

As specific examples, an example tight side heated polymer solution may contain from 10 to 30 weight percent polymer, such as from 12 to 25 weight percent polymer. An example open side heated polymer solution may contain from 5 to 20 weight percent polymer, such as from 8 to 15 weight percent polymer.

Figure 2A:
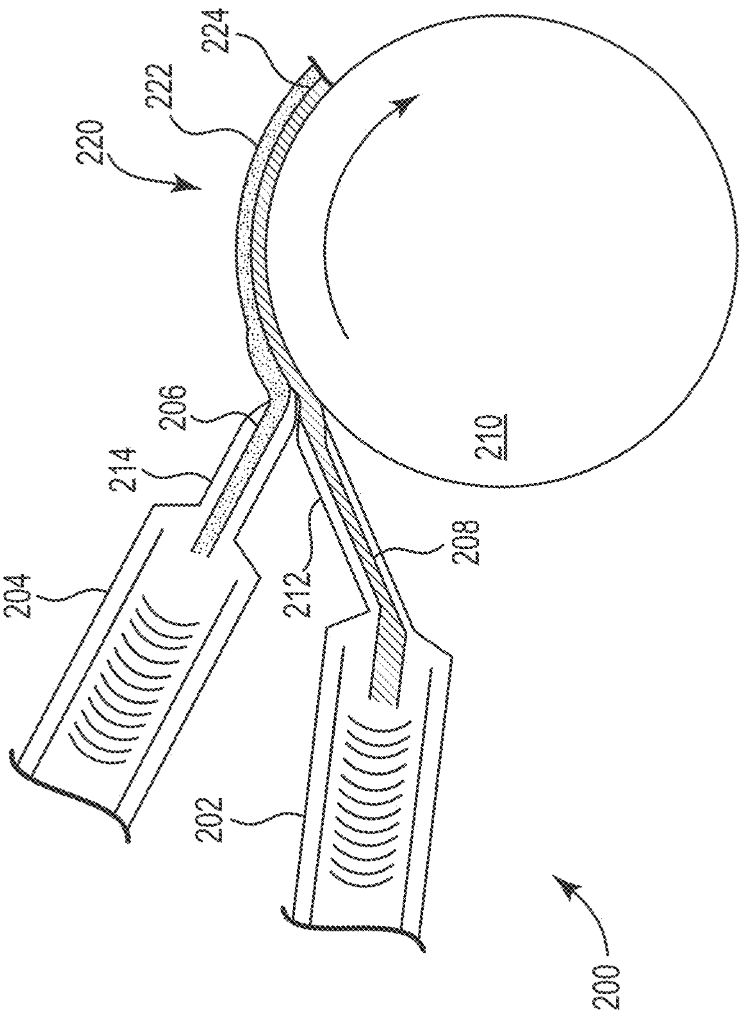
FIG. 2A shows an example of a co-extrusion method as described.

Referring to FIG. 2A, shown schematically is a side-view of a co-extrusion system useful to prepare a porous filter membrane 220, as described herein, by a co-extrusion method. Co-extrusion system 200 includes extruder 202 for extruding a flow of a first heated polymer solution (tight side heated polymer solution) 208, and extruder 204 for extruding a flow of a second heated polymer solution (open side heated polymer solution) 206. In operation, tight side heated polymer solution 208 has a concentration of polymer ($PC_{TS}$) (mass polymer per volume polymer solution or per mass polymer solution) and flows through extruder 202 and die 212 at a flow rate ($F_{TS}$) (mass or volume polymer solution per time). The tight side heated polymer solution passes through die 212 and is placed to contact chill roll 210 as tight side 224 of membrane 220. Open side heated polymer solution 206 has a concentration of polymer ($PC_{OS}$) (mass polymer per volume polymer solution or per mass polymer solution), and flows through extruder 204 and die 214 at a flow rate ($F_{OS}$) (mass or volume polymer solution per time). Open side heated polymer solution 206 passes through die 214 and is placed over a surface of tight side 224, as open side 222, of membrane 220.

When the two flows of heated polymer solutions 206 and 208 are formed as layers 222 and 224 on the chilled surface of chill roll 210, phase separation and coagulation of the polymer present in the heated polymer solutions occurs, forming a porous membrane having a tight side and an open side as described. Tight side 224 coagulates quickly by close contact with the surface of chill roll 221. The quick coagulation will form pores that are smaller relative to the pores formed in open side 222, which form more slowly due to being not in direct contact with chill roll 210.

Figure 2B:
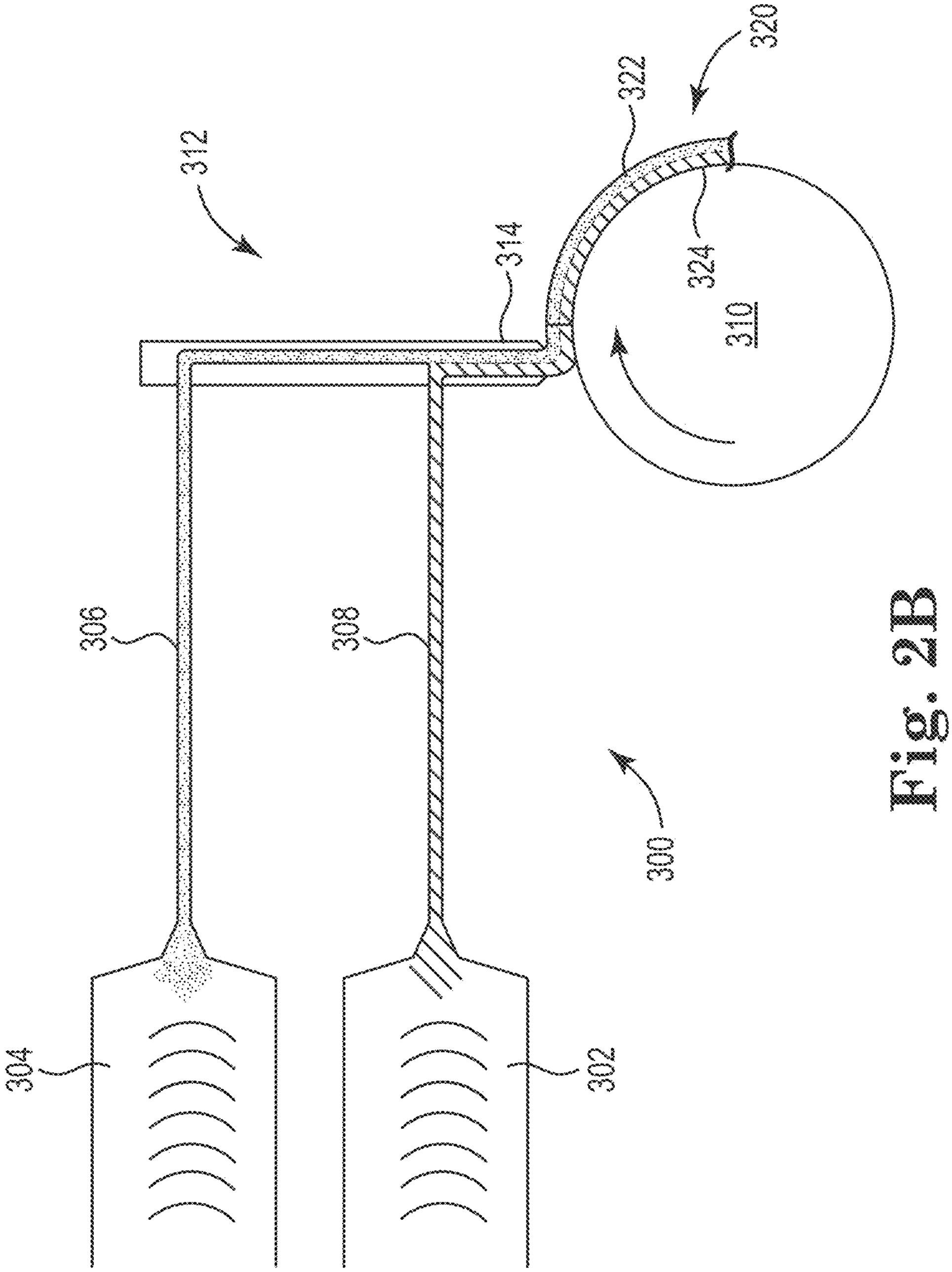
FIG. 2B shows an example of a co-extrusion method as described.

Referring to FIG. 2B, shown schematically is a side-view of an alternative co-extrusion system useful to prepare a porous filter membrane 320, as described herein, by a co-extrusion method that uses a single die 312. Co-extrusion system 300 includes extruder 302 for extruding a flow of a first heated polymer solution (tight side heated polymer solution) 308, and extruder 304 for extruding a flow of a second heated polymer solution (open side heated polymer solution) 306. In operation, tight side heated polymer solution 308 has a concentration of polymer ($PC_{TS}$) (mass polymer per volume polymer solution or per mass polymer solution) and flows through extruder 302 and die 312 at a flow rate ($F_{TS}$) (mass or volume polymer solution per time). The tight side heated polymer solution passes through die 312 and die opening 314 and is placed to contact chill roll 310 as tight side 324 of membrane 320. Open side heated polymer solution 306 has a concentration of polymer ($PC_{OS}$) (mass polymer per volume polymer solution or per mass polymer solution) and flows through extruder 304 and die 312 at a flow rate ($F_{OS}$) (mass or volume polymer solution per time). Open side heated polymer solution 306 passes through die 312 and die opening 314, simultaneously with the flow of tight side heated polymer solution 308 and becomes located adjacent to (on top of) tight side 324, as open side 322, of membrane 320.

When the two flows of heated polymer solutions 306 and 308 are formed as layers 322 and 324 on the chilled surface of chill roll 310, phase separation and coagulation of the polymer present in the heated polymer solutions occurs, forming a porous membrane having a tight side and an open side as described. Tight side 324 coagulates quickly by close contact with the surface of chill roll 321. The quick coagulation will form pores that are smaller relative to the pores formed in open side 322, which form more slowly due to being not in direct contact with chill roll 310.

Factors of the co-extrusion processes of system 200 or 300 can be selected and controlled to achieve the desired morphology of each of the tight side and the open side, and to achieve desired relative thicknesses of the tight side and the open side. These factors can include the flow rates of the two heated polymer solutions, i.e., ($F_{TS}$ and $F_{OS}$) and the concentrations of polymer in each of the heated polymer solutions ($PC_{TS}$ and $PC_{OS}$). For example, to produce a thickness of the open side that is greater than a thickness of the tight side, the flow rate of the tight side can be lower than the flow rate of the open side ($F_{TS}<F_{OS}$), with examples of specific relative flow rates of the two heated polymer solutions being described elsewhere herein. Additionally, or alternatively, to form smaller pores in the tight side as compared to the open side, the polymer concentration of the tight side can be higher than the polymer concentration of the open side ($PC_{TS}>PC_{OS}$).

In commercial melt-cast methods of forming polymeric, porous membranes, an optional step is to stretch the membrane after the membrane is extruded and coagulated to form a solid membrane. A stretching step uses force to cause a cast membrane, after extrusion and cooling, to be extended in a length direction or a width direction, or both, which causes a reduction in thickness of the membrane. The shapes of open pores within the membrane are affected, e.g., by elongation in a direction of the stretching.

In contrast to melt cast methods that include a step of stretching a melt-cast membrane in one or two directions of a length, width, or both, a porous membrane of the described herein does not require and may exclude a stretching step in one direction (length or width) or in both of a width and a length direction. No stretching of the membrane in either a length or a width direction is required for a membrane as described to exhibit flow and bubble points as described. For example, a membrane as described may be prepared without any stretching step or with insubstantial stretching between preparing the membrane by a melt-cast method and installing the membrane in a filter product, such as a filter cartridge. A membrane may be processed by without any stretching or with minimal stretching, e.g., by steps that do not cause stretching (permanent deformation) of the membrane in one direction or in both directions of more than 5, 2, or 1 percent.

A filter membrane as described herein, or a filter or filter component that contains the filter membrane, can be useful in a method of filtering a liquid chemical material to purify or otherwise remove unwanted material from the liquid chemical material, especially to produce a highly pure liquid chemical material that is useful for an industrial process that requires chemical material input that has a very high level of purity. Generally, the liquid chemical may be any of various useful commercial materials and may be a liquid chemical that is useful in any of a variety of different industrial or commercial applications. Particular examples of filter membranes as described can be used for purifying a liquid chemical that is used or useful in a semiconductor or microelectronic fabrication application, e.g., for filtering a liquid solvent or other process solution used in a method of semiconductor photolithography, a wet etching or cleaning step, a method of forming spin-on-glass (SOG), for a backside anti-reflective coating (BARC) method, etc.

Some specific, non-limiting, examples of liquid solvents that can be filtered using a filter membrane as described include: n-butyl acetate (nBA), isopropyl alcohol (IPA), 2-ethoxyethyl acetate (2EEA), cyclohexanone, ethyl lactate, gamma-butyrolactone, hexamethyldisilazane, methyl-2-hydroxyisobutyrate, methyl isobutyl carbinol (MIBC), n-butyl acetate, methyl isobutyl ketone (MIBK), isoamyl acetate, propylene glycol monoethyl ether, propylene glycol methyl ether (PGME), 2-heptanone, and propylene glycol monomethyl ether acetate (PGMEA).

The filter membrane can be contained within a larger filter structure such as a filter or a filter cartridge that is used in a filtering system. The filtering system will place the filter membrane, e.g., as part of a filter or filter cartridge, in a flow path of a liquid chemical to cause the liquid chemical to flow through the filter membrane so that the filter membrane is able to remove impurities and contaminants from the liquid chemical. The structure of a filter or filter cartridge may include one or more of various additional materials and structures that support the porous filter membrane within the filter to cause fluid to flow from a filter inlet, through the filter membrane, and thorough a filter outlet, thereby passing through the filter membrane when passing through the filter. The filter membrane supported by the filter structure can be in any useful shape, e.g., a pleated cylinder, cylindrical pads, one or more non-pleated (flat) cylindrical sheets, a pleated sheet, among others.

One example of a filter structure that includes a filter membrane in the form of a pleated cylinder can be prepared to include the following component parts, any of which may be included in a filter construction but may not be required: a rigid or semi-rigid core that supports a pleated cylindrical coated filter membrane at an interior opening of the pleated cylindrical coated filter membrane; a rigid or semi-rigid cage that supports or surrounds an exterior of the pleated cylindrical coated filter membrane at an exterior of the filter membrane; optional end pieces or "pucks" that are situated at each of the two opposed ends of the pleated cylindrical coated filter membrane; and a filter housing that includes an inlet and an outlet. The filter housing can be of any useful and desired size, shape, and materials, and can preferably be made of suitable polymeric materials.

Figure 3:
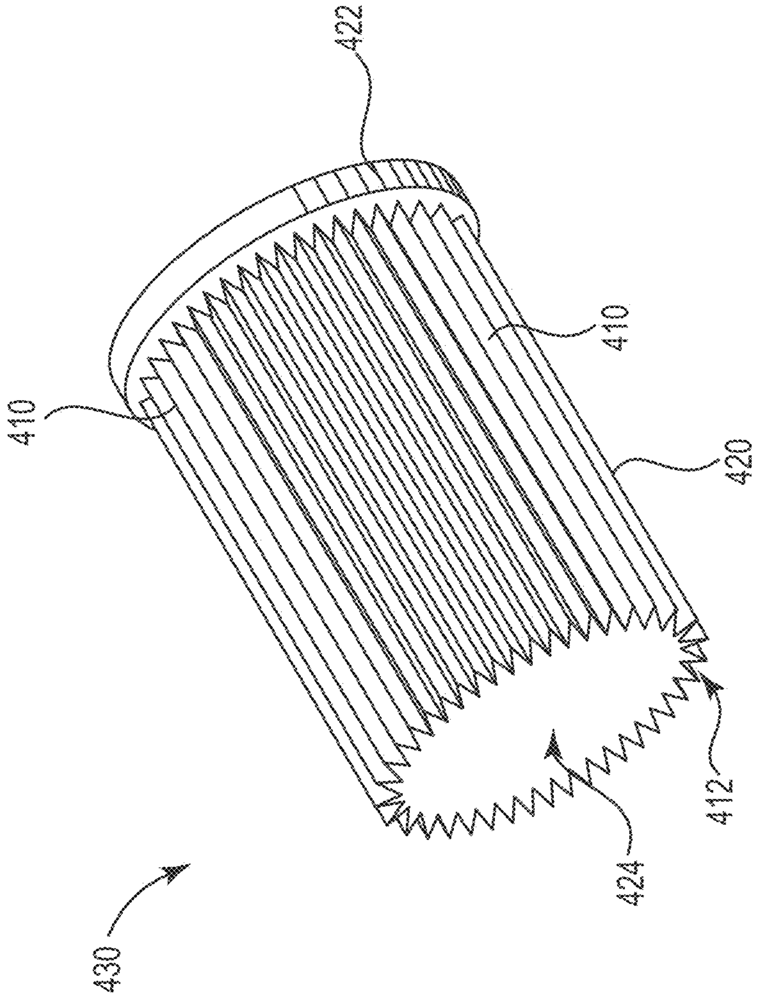
FIG. 3 shows an example of a filter product as described.

As one example, FIG. 3 shows filter component 430, which is a product of pleated cylindrical component 410 and end piece 422, with other optional components. Cylindrical component 410 includes a filter membrane 412, as described herein, and is pleated. End piece 422 is attached (e.g., "potted") to one end of cylindrical filter component 410. End piece 422 can preferably be made of a melt-processable polymeric material. A core (not shown) can be placed at the interior opening 424 of pleated cylindrical component 410, and a cage (not shown) can be placed about the exterior of pleated cylindrical component 410. A second end piece (not shown) can be attached ("potted") to the second end of pleated cylindrical component 430. The resultant pleated cylindrical component 430 with two opposed potted ends and optional core and cage can then be placed into a filter housing that includes an inlet and an outlet and that is configured so that an amount of fluid entering the inlet must necessarily pass through filtration membrane 412 before exiting the filter at the outlet.

The filter housing can be of any useful and desired size, shape, and materials, and can preferably be a fluorinated or non-fluorinated polymer such as nylon, polyethylene, or fluorinated polymer such as a poly(tetrafluoroethylene-co-perfluoro(alkyvinylether)), TEFLON® perfluoroalkoxyalkane (PFA), perfluoromethylalkoxy (MFA), or another suitable fluoropolymer (e.g., perfluoropolymer).

Example

Figure 4:
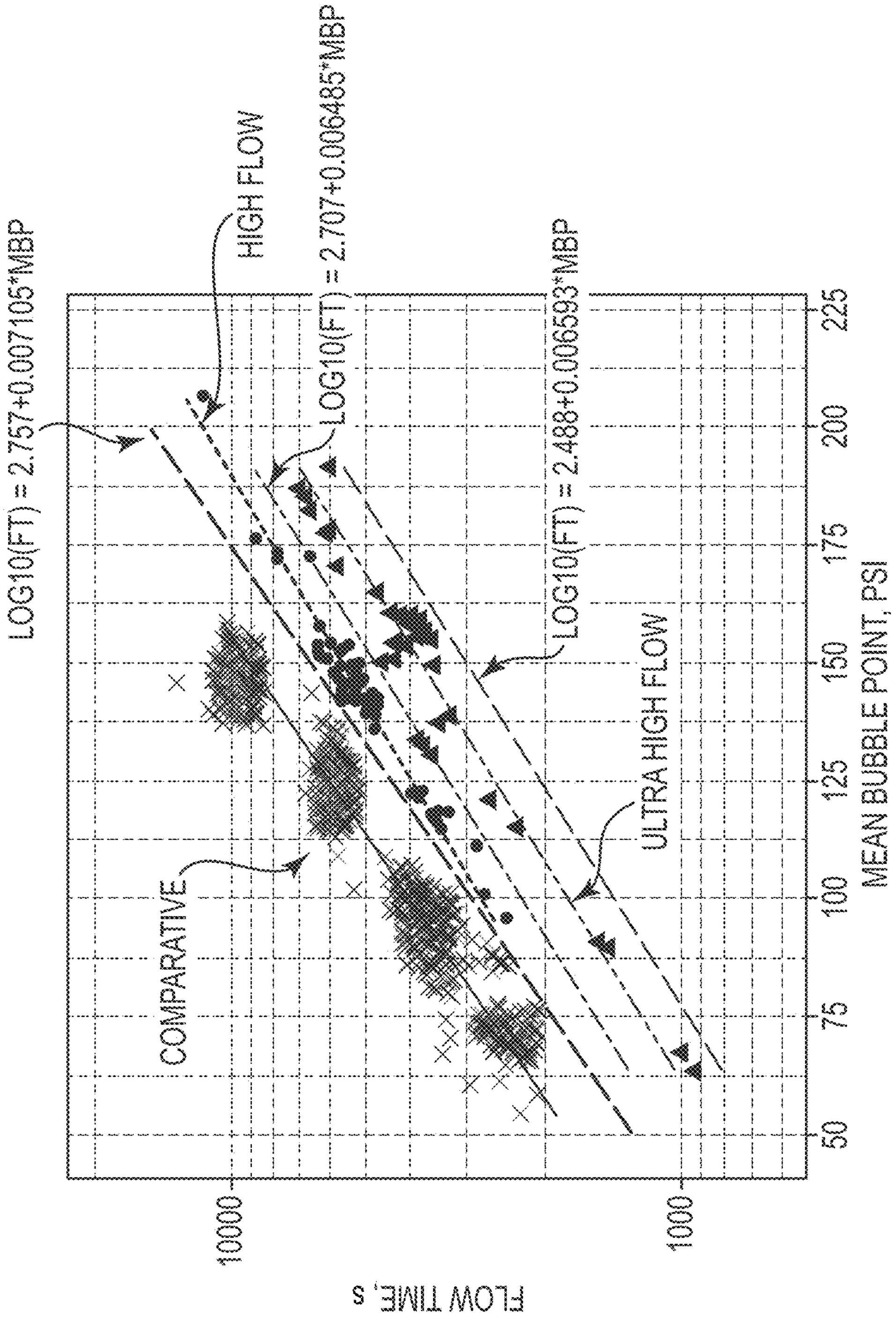
FIG. 4 shows a plot of the log 10 flow time on the Y axis and the mean bubble point on the X axis for the membranes tested in the Example.

Referring to FIG. 4, shown is a scatterplot of log flow time (seconds) relative to mean bubble point (psi) of three filter membranes: filter membrane 1 ("high flow"-- circles), filter membrane 2 ("ultra high flow"-- triangles), and comparative (non-inventive) filter membrane (upper points indicated by "X"s). Filter membrane 1 was made from a single polymer and had an average molecular weight of about 1.70 Mdaltons and a thickness of about 80 microns. Filter membrane 2 was made from a blend of two polymer and had an average molecular weight of about 1.15 Mdaltons and a thickness of about 100 microns. The comparative filter membrane was made from a blend of two polymer and had an average molecular weight of about 2.60 Mdaltons and a thickness of about 50 microns. The mean bubble point was determined using the Mean Bubble Point Test described above and the flow time was determined using the Flow Time Test described above.

As shown, filter membranes 1 and 2 exhibit very favorable flow properties, as shown by reduced flow times, for higher mean bubble points. At a mean bubble point of approximately 150 psi, the flow time of filter membrane 1 is at or below approximately 6000 s, and the flow time of filter membrane 2 is at or below approximately 4000 s, while the flow time of the comparative filter membrane is above 9000 s. Also, as shown in FIG. 4 there is a demarcation between the comparative filter membranes and filter membranes 1 and 2. The comparative filter membranes have a log 10(flow time) greater than 2.757+0.007105*(mean bubble point). Filter membranes 1 and 2 have a log 10(flow time) less than 2.757+0.007105*(mean bubble point) and a log 10(flow time) greater than or equal to 2.4888+0.006593*(mean bubble point). The filter membranes 1 generally have a log 10(flow time) less than 2.757+0.007105*(mean bubble point) and a log 10(flow time) greater than 2.707+0.006485*(mean bubble point). The filter membranes 2 generally have log 10(flow time) less than or equal to 2.707+0.006485*(mean bubble point) and a log 10(flow time) greater than or equal to 2.4888+0.006593*(mean bubble point).

ASPECTS OF THE DISCLOSURE

In a first aspect of the disclosure, a porous polyethylene membrane comprising a first side and an opposing second side and a thickness between the first and second sides, the membrane exhibiting a log 10 flow time (seconds) relative to mean bubble point (pounds per square inch) that is less than a log 10 flow time relative to mean bubble point according to the equation: log 10(flow time)=2.757+0.007105*(mean bubble point) wherein: flow time is measured using the Flow Time Test, and mean bubble point is measured using the Mean Bubble Point Test.

In a second aspect according to the first aspect, the membrane exhibits a log 10 flow time (seconds) relative to mean bubble point (pounds per square inch) that is less than or equal to a log 10 flow time relative to mean bubble point according to the equation: log 10(flow time)=2.707+0.006485*(mean bubble point).

In a third aspect according to the first or second aspect, the first side comprises polyethylene having a first average molecular weight, the second side comprises polyethylene having a second average molecular weight, and the first molecular weight is equal to the second molecular weight.

In a fourth aspect according to any preceding aspect, the membrane has a thickness in a range from 30 to 200 microns.

In a fifth aspect according to the first aspect, the membrane exhibits a log 10 flow time (seconds) relative to mean bubble point (pounds per square inch) that is 5 percent less than a log 10 flow time relative to mean bubble point according to the equation: log 10(flow time)=2.757+0.007105*(mean bubble point).

In a sixth aspect according to the second aspect, the membrane exhibits a log 10 flow time (seconds) relative to mean bubble point (pounds per square inch) that is 5 percent less than a log 10 flow time relative to mean bubble point according to the equation: log 10(flow time)=2.707+0.006485*(mean bubble point).

In a seventh aspect according to any preceding aspect, the membrane exhibits a log 10 flow time (seconds) relative to the mean bubble point (pounds per square inch) that is greater than or equal to a log 10 flow time relative to mean bubble point according to the equation: log 10(flow time)=2.4888+0.006593*(mean bubble point).

In an eighth aspect, a filter cartridge comprises a membrane of any of the preceding aspect, the filter cartridge comprising a filter housing comprising an inlet, an outlet, and the membrane supported within the housing between the inlet and the outlet such that liquid entering the inlet passes through the membrane before passing through the outlet.

In a ninth aspect, a method of using a filter cartridge of the eighth aspect comprises causing fluid to flow into the inlet, through the membrane, and out the outlet, wherein the fluid is useful in a semiconductor manufacturing processes.

In a tenth aspect, a method of preparing a co-extruded, porous polyethylene membrane having a first side and an opposing second side and a thickness between the first and second sides, with pores throughout the thickness comprises: co-extruding a first heated liquid polymer solution and a second heated liquid polymer solution, the first polymer solution comprising polyethylene in liquid solvent, and the second polymer solution comprising polyethylene in liquid solvent, and reducing temperature of the co-extruded liquid polymer solutions to cause the polymer of the liquid polymer solutions to coagulate to form the membrane, the membrane comprising a tight side formed from the first polymer solution and an open side formed from the second polymer solution, the membrane exhibiting a log 10 flow time (seconds) relative to mean bubble point (pounds per square inch) that is less than a log 10 flow time relative to mean bubble point according to the equation: log 10(flow time)=2.757+0.007105*(mean bubble point), wherein flow time is measured using the Flow Time Test and mean bubble point is measured using the Mean Bubble Point Test.

An eleventh aspect according to the tenth aspect further comprising extruding the first polymer solution at a flow rate in a range from 15 to 40 percent of the total flow rate (mass per time) of the first polymer solution and the second polymer solution.

A twelfth aspect according to the tenth or eleventh aspect further comprising: extruding the first polymer solution having a first concentration of polymer in the first polymer solution and extruding the second polymer solution having a second concentration of polymer in the second polymer solution, wherein the first concentration is greater than the second concentration.

A thirteenth aspect according to any of the tenth through twelfth aspects further comprising: co-extruding the first heated polymer solution and the second heated polymer solution at an extrusion temperature and reducing temperature of the co-extruded heated polymer solutions by contacting the first heated polymer solution with a surface that has a temperature that is below the extrusion temperature.

In a fourteenth aspect according to any of the tenth through thirteenth aspects, the first heated polymer solution forms a tight layer of the membrane having pores having an average pore size, and the second heated polymer solution forms an open layer of the membrane having pores having an average pore size that is greater than the average pore size of the pores of the tight porous portion.

In a fifteenth aspect according to any of the tenth through fourteenth aspects, the membrane has a thickness in a range from 30 to 200 microns.

In a sixteenth aspect according to any of the tenth through fifteenth aspects, the first side comprises polyethylene having an average molecular weight in a range from 500,000 Dalton to 3,000,000 Dalton, and the second side comprises polyethylene having an average molecular weight in a range from 500,000 Dalton to 3,000,000 Dalton.

In a seventeenth aspect according to any of the tenth through sixteenth aspects, the first side comprises polyethylene having an average molecular weight in a range from 500,000 Dalton to 2,000,000 Dalton, and the second side comprises polyethylene having an average molecular weight in a range from 500,000 Dalton to 2,000,000 Dalton.

In an eighteenth aspect according to any of the tenth through seventeenth aspects, the membrane exhibits a log 10 flow time (seconds) relative to mean bubble point (pounds per square inch) that is less than or equal to a log 10 flow time relative to mean bubble point according to the equation: log 10(flow time)=2.707+0.006485*(mean bubble point).

In a nineteenth aspect, a method of preparing a filter cartridge comprises: preparing a membrane according to a method of any of tenth through eighteenth aspects and installing the membrane in a filter housing that comprises an inlet, an outlet, and the membrane supported within the housing between the inlet and the outlet such that liquid entering the inlet passes through the membrane before passing through the outlet.

In a twentieth aspect according to the nineteenth aspect, the membrane is prepared by a co-extrusion method as described and is unstretched when installed in the filter housing.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. Changes may be made in details without exceeding the scope of the disclosure. The disclosure's scope is, of course, defined in the language in which the appended claims are expressed.

What is claimed is:

1. A porous polyethylene membrane comprising:

a first side;

an opposing second side; and a thickness between the first side and the second side, the porous polyethylene membrane exhibiting a log 10 flow time (seconds) relative to mean bubble point (pounds per square inch) that is less than a log 10 flow time relative to mean bubble point according to the equation:

log 10(flow time)=2.757+0.007105*(mean bubble point)

wherein:

the thickness between the first side and the second side is in a range from 80 μm to 200 μm, the mean bubble point is at least 50 pounds per square inch, flow time is measured using the Flow Time Test, and mean bubble point is measured using the Mean Bubble Point Test.

2. The porous polyethylene membrane of claim 1, wherein the porous polyethylene membrane exhibits a log 10 flow time (seconds) relative to mean bubble point (pounds per square inch) that is less than or equal to a log 10 flow time relative to mean bubble point according to the equation:

log 10(flow time)=2.707+0.006485*(mean bubble point).

3. The porous polyethylene membrane of claim 2, wherein the porous polyethylene membrane exhibits a log 10 flow time (seconds) relative to mean bubble point (pounds per square inch) that is less than a log 10 flow time relative to mean bubble point according to the equation:

log 10(flow time)=2.707+0.006485*(mean bubble point).

4. The porous polyethylene membrane of claim 1, wherein the porous polyethylene membrane exhibits a log 10 flow time (seconds) relative to the mean bubble point (pounds per square inch) that is greater than or equal to a log 10 flow time relative to mean bubble point according to the equation:

log 10(flow time)=2.4888+0.006593*(mean bubble point).

5. A filter cartridge comprising the porous polyethylene membrane of claim 1, the filter cartridge comprising a filter housing comprising an inlet, an outlet, and the porous polyethylene membrane supported within the housing between the inlet and the outlet such that liquid entering the inlet passes through the porous polyethylene membrane before passing through the outlet.

6. A method of using a filter cartridge of claim 5, the method comprising causing fluid to flow into the inlet, through the porous polyethylene membrane, and out the outlet, wherein the fluid is useful in a semiconductor manufacturing processes.

7. A method of preparing a co-extruded, porous polyethylene membrane having a first side and an opposing second side and a thickness between the first side and the second side, with pores throughout the thickness, the method comprising:

co-extruding a first heated liquid polymer solution and a second heated liquid polymer solution, the first polymer solution comprising polyethylene in liquid solvent, and the second polymer solution comprising polyethylene in liquid solvent, and reducing temperature of the co-extruded liquid polymer solutions to cause the polymer of the liquid polymer solutions to coagulate to form the co-extruded, porous polyethylene membrane, the co-extruded, porous polyethylene membrane comprising a tight side formed from the first polymer solution and an open side formed from the second polymer solution, the co-extruded, porous polyethylene membrane exhibiting a log 10 flow time (seconds) relative to mean bubble point (pounds per square inch) that is less than a log 10 flow time relative to mean bubble point according to the equation:

log 10(flow time)=2.757+0.007105*(mean bubble point)

wherein:

the open side has an average size of pores greater than an average size of pores of the tight side;

the thickness between the first side and the second side is in a range from 80 μm to 200 μm, and a tight side thickness of the first side is in a range from 20 to 45 percent and an open side thickness of the opposing second side is in a range from 55 to 80 percent of the thickness between the first side and the second side, wherein the mean bubble point is at least 50 pounds per square inch, flow time is measured using the Flow Time Test, and mean bubble point is measured using the Mean Bubble Point Test.

8. The method of claim 7, further comprising extruding the first polymer solution at a flow rate in a range from 15 to 40 percent of the total flow rate (mass per time) of the first polymer solution and the second polymer solution.

9. The method of claim 7, further comprising:

extruding the first polymer solution having a first concentration of polymer in the first polymer solution, and extruding the second polymer solution having a second concentration of polymer in the second polymer solution, wherein the first concentration is greater than the second concentration.

10. The method of claim 7, further comprising:

co-extruding the first heated polymer solution and the second heated polymer solution at an extrusion temperature, and reducing temperature of the co-extruded heated polymer solutions by contacting the first heated polymer solution with a surface that has a temperature that is below the extrusion temperature.

11. The method of claim 7, wherein the co-extruded, porous polyethylene membrane exhibits a log 10 flow time (seconds) relative to mean bubble point (pounds per square inch) that is less than or equal to a log 10 flow time relative to mean bubble point according to the equation:

$$\log 10(\text{flow time})=2.707+0.006485*(\text{mean bubble point}).$$

12. The porous polyethylene membrane of claim 1 wherein the thickness between the first side and the second side is in a range from 80 μm to 100 μm.

13. The method of claim 7 wherein the thickness between the first side and the second side is in a range from 80 μm to 100 μm.

14. The porous polyethylene membrane of claim 1, wherein the first side comprises polyethylene having a first average molecular weight in a range from 500,000 Da to 2,000,000 Da, and the second side comprises polyethylene having a second average molecular weight in a range from 500,000 Da to 2,000,000 Da.

15. The porous polyethylene membrane of claim 7, wherein the first side comprises polyethylene having a first average molecular weight in a range from 500,000 Da to 2,000,000 Da, and the second side comprises polyethylene having a second average molecular weight in a range from 500,000 Da to 2,000,000 Da.

16. The porous polyethylene membrane of claim 1, wherein the tight side has an average pore size in a range from about 10 nanometers to 10 microns.

* * * * *